United States Patent [19]

Heymer et al.

[11] 3,853,486
[45] Dec. 10, 1974

[54] PROCESS FOR THE MANUFACTURE OF PYROPHOSPHORIC ACID BY CRYSTALLIZATION

[75] Inventors: Gero Heymer, Hurth-Knapsack; Horst-Dieter Wasel-Nielen, Erftstadt-Lechenich, both of Germany

[73] Assignee: Knapsack Aktiengesellschaft, Knapsack near Cologne, Germany

[22] Filed: Feb. 23, 1972

[21] Appl. No.: 228,772

[30] Foreign Application Priority Data
Feb. 25, 1971 Germany............................ 2108857

[52] U.S. Cl................ 23/301 R, 423/316, 423/317, 423/321
[51] Int. Cl......................... B01d 9/00, C01b 25/24
[58] Field of Search ............. 23/300, 301 R, 312 P; 423/316, 317, 321

[56] References Cited
UNITED STATES PATENTS

| | | | |
|---|---|---|---|
| 1,451,786 | 4/1923 | Ross et al........................... | 23/301 R |
| 3,371,992 | 3/1968 | Shen ................................... | 423/316 |
| 3,453,075 | 7/1969 | Shen ................................... | 423/316 |
| 3,547,825 | 12/1970 | Shen ................................... | 423/316 |

FOREIGN PATENTS OR APPLICATIONS
925,465   3/1955   Germany .............................. 23/165

OTHER PUBLICATIONS

Gerber, et al., "Determination of Ortho-, Pyro-, and Metaphosphoric Acids," Ind. Eng. Chem. Anal. Ed., Vol. 10, pp. 519–524 (1938).

*Primary Examiner*—Norman Yudkoff
*Assistant Examiner*—R. T. Foster
*Attorney, Agent, or Firm*—Connolly and Hutz

[57] ABSTRACT

Production of pure, crystallized pyrophosphoric acid with a strength of at least 95 percent. A polyphosphoric acid is treated so as to establish a $P_2O_5$-concentration between 79 and 81 weight percent therein, between 1 and 5 weight percent of crystallized pyrophosphoric acid seed crystals are added thereto, the resulting mixture is heated, while continuously kneading it with exclusion of moisture, to temperatures between 40° and 50°C, the mixture is cooled once upon the start of crystallization, down to temperatures between 20° and 35°C, and kneading is continued until the crystallization is complete. The heat of crystallization is dissipated by subjecting the mixture to further cooling so as to prevent the mixture from excelling a temperature of 50°C.

1 Claim, No Drawings

PROCESS FOR THE MANUFACTURE OF PYROPHOSPHORIC ACID BY CRYSTALLIZATION

The present invention relates to a process for the manufacture of pure crystallized pyrophosphoric acid having a strength of at least 95 percent.

Pyrophosphoric acid ($H_4P_2O_7$) is a crystalline, colorless and strongly hygroscopic material containing 79.8 weight percent of $P_2O_5$. It is inter alia contained in polyphosphoric acid and can be obtained therefrom (cf. VAN WAZER: "Phosphorus and Its Compounds," Interscience publishers, New York, 1958, volume I, page 619) by crystallization. This naturally affects the equilibrium of the polyphosphoric acids having inconsistent chain lengths which, however, tends to reestablish with the formation of further pyrophosphoric acid with the result that polyphosphoric acid containing 79.8 weight percent of $P_2O_5$ undergoes complete conversion to crystalline pyrophosphoric acid. The reaction time needed to achieve this is as long as approximately one month.

German Patent No. 925,465 describes a process for making crystalline pyrophosphoric acid with a strength of 92 percent, wherein phosphorus pentoxide is dissolved in water or orthophosphoric acid at temperatures of at most 200°C so as to produce a mixture with the stoichiometric composition of $2 H_2O . P_2O_5$, and the mixture so obtained is cooled to effect crystallization. The use of high temperatures for making the mixture is disadvantageous in this process as contaminants originating from the container material may be introduced into the acid. In addition thereto, relatively long periods of time are needed to effect the crystallization.

As taught in U.S. Pat. No. 3,371,992, solid pyrophosphoric acid seed crystals are added to a dispersion of liquid polyphosphoric acid and a non-aqueous solvent, at temperatures lower than the fusion point of pyrophosphoric acid, and the resulting mass is stirred until the conversion of polyphosphoric acid to pyrophosphoric acid is complete. To obtain the pyrophosphoric acid, the whole is filtered and the filtration residue is treated under vacuum so as to remove the non-aqueous solvent adhering thereto. These are additional and non-beneficial steps which are required to be carried out so as to obtain pure pyrophosphoric acid.

As taught in U.S. Pat. No. 3,453,075, liquid polyphosphoric acid is mixed at temperatures between 25°C and the fusion point of pyrophosphoric acid with a screened fraction of pyrophosphoric acid seed crystals until solidification of the whole mass. This is a rather costly and non-beneficial process, wherein the hygroscopic pyrophosphoric acid is required to be ground and sieved to obtain the desirable sieve fraction and wherein the liquid polyphosphoric acid and the pyrophosphoric acid seed crystals are required to be used in a ratio by weight between 1:1 and 1:50.

It is an object of the present invention to provide a process permitting crystalline pyrophosphoric acid with a strength of at least 95 percent to be produced in good space/time yields by a few and simple steps.

The process of the present invention comprises more particularly treating a polyphosphoric acid so as to establish a $P_2O_5$ concentration between 79 and 81 weight percent, preferably 80 weight percent, therein, adding between 1 and 5 weight percent of pyrophosphoric acid seed crystals thereto, heating the resulting mixture, while continuously kneading it with the exclusion of moisture, to temperatures between 40° and 55°C, preferably 45°C, cooling the mixture once upon the start of crystallization, down to temperatures between 20° and 35°C, preferably 25° and 30°C, further kneading the mixture until the crystallization is complete, the heat of crystallization being dissipated by subjecting the mixture to further cooling so as to prevent the mixture from excelling a temperature of 50°C, preferably 40°C.

Further preferred embodiments of the process of the present invention, which may be used singly or in combination, comprise:

a. establishing the $P_2O_5$-concentration in the polyphosphoric acid by mixing a polyphosphoric acid having more than 81 weight percent of $P_2O_5$ therein with a polyphosphoric acid containing less than 79 weight percent of $P_2O_5$;

b. establishing the $P_2O_5$-concentration in the polyphosphoric acid by mixing a polyphosphoric acid having more than 81 weight percent of $P_2O_5$ therein with orthophosphoric acid;

c. establishing the $P_2O_5$-concentration in the polyphosphoric acid by mixing a polyphosphoric acid having more than 81 weight percent of $P_2O_5$ therein with water;

d. kneading the mixture for a further period between 0.5 and 3 hours, from the start of crystallization.

It is a particularly beneficial effect of the process of the present invention that all these steps can be effected in a single container without the need to take special measures, such as those normally required, for the exclusion of moisture during the treatment of pyrophosphoric acid.

Still further, the process of the present invention merely calls for the use of a minor proportion of seed crystals. Under practical conditions, these are added once, namely upon the start of the reaction in the container. The quantity of seed crystals which adhere to the wall of the container or kneading tools is sufficient to sustain further reactions.

Steps which ensure the rapid abstraction of the fusion heat set free must, however, be taken as the crystallization goes on. This in view of the fact that fresh seed crystals fail to be formed at temperatures higher than 50°C, in the crystallizing mass.

Still further, the process of the present invention yields pyrophosphoric acid which need not be subjected to any finishing treatment.

EXAMPLE 1

(Prior art process)

9.55 kg of polyphosphoric acid with 84 weight percent of $P_2O_5$ therein were placed in a kneader and mixed therein with 0.45 kg of water. 2 kg of crystallized pyrophosphoric acid were added and the whole was heated for 3 hours to 60°C and kneaded continually. After a further 5 hours, the mixture still was viscous. The mixture was taken from the kneader and placed in a polyethylene bag in which it solidified within 12 hours.

The solidified material was subjected to gas-chromatographical analysis and the following results were obtained:

1.1 % of orthophosphoric acid
87.2 % of pyrophosphoric acid
2.8 % of triphosphoric acid
2.3 % of tetraphosphoric acid 6.6 % of higher condensed phosphoric acids.

EXAMPLE 2:

(Process of invention)

9.55 kg of polyphosphoric acid with 84 weight percent of $P_2O_5$ therein were placed in a kneader, mixed therein with 0.45 kg of water, and 0.2 kg of crystallized pyrophosphoric acid was added. The mixture was kneaded continually and heated for 2 hours to 50°C, and crystallization commenced to occur. After cooling down to 30°C, kneading was continued for a further one hour at a maximum temperature of 41°C. Following this, a colorless, particulate, pourable substance, which had a melting point of 74°C was obtained. It was subjected to gas-chromatographical analysis and the following results were obtained.

1.1 % of orthophosphoric acid
96.6 % of pyrophosphoric acid
2.3 % of triphosphoric acid.

EXAMPLE 3:

(Process of invention)

8.22 kg of polyphosphoric acid with 84 weight percent of $P_2O_5$ therein were placed in a kneader and mixed therein within 1.78 kg of orthophosphoric acid containing 61.6 weight percent of $P_2O_5$. The minor proportions of crystalline pyrophosphoric acid which originated from a previous batch and adhered to the kneading tools and walls of the container were used as seed crystals. The further procedure was the same as that reported in Example 2, save that the total reaction time was 2.5 hours. The colorless, particulate and pourable final product was subjected to gaschromatographical analysis, and the following results were obtained:

1.5 % of orthophosphoric acid
95.3 % of pyrophosphoric acid
3.2 % of triphosphoric acid

EXAMPLE 4:

(Process of invention)

4.88 kg of polyphosphoric acid with 84 weight percent of $P_2O_5$ therein were placed in the kneader of Example 3 and mixed therein with 5.12 kg of polyphosphoric acid containing 76 weight percent of $P_2O_5$. Fresh seed crystals were not added. The further procedure was the same as that reported in Example 2. The total reaction time was 2 hours. The resulting colorless, particulate and pourable final product was subjected to gas chromatography and the following results were obtained:

1.0 % of orthophosphoric acid
97.9 % of pyrophosphoric acid
1.1 % of triphosphoric acid.

We claim:

1. A process for the manufacture of pure, crystallized pyrophosphoric acid with a strength of at least 95 percent from polyphosphoric acid with a $P_2O_5$-concentration between 79 and 81 weight percent and crystallized pyrophosphoric acid as seeding agent, which comprises adding to the polyphosphoric acid between 1 and 5 weight percent of crystallized pyrophosphoric acid, heating the resulting mixture for a period of about 2 hours, while continuously kneading it and with the exclusion of moisture, to temperatures between 40° and 55°C, cooling the mixture once upon the start of crystallization down to temperatures between 20° and 35°C, and further kneading the mixture for a period between 0.5 and 3 hours from the start of crystallization, the said mixture being maintained at temperatures of at most 50°C by dissipating the heat of crystallization.

* * * * *